United States Patent Office 2,809,864
Patented Oct. 15, 1957

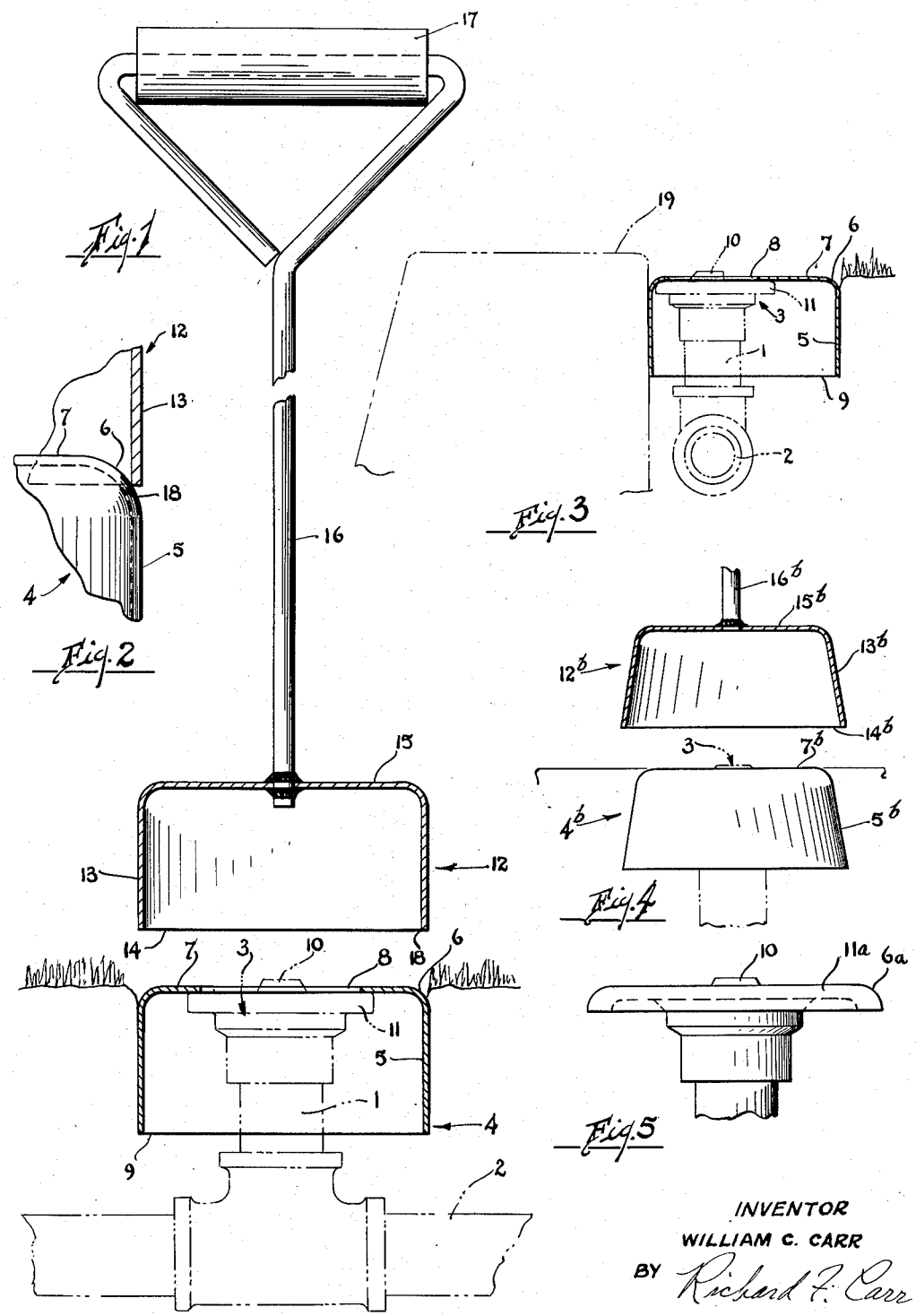

2,809,864

TRIMMING TOOL

William C. Carr, Los Angeles, Calif.

Application September 4, 1953, Serial No. 378,634

6 Claims. (Cl. 299—60)

This invention pertains to a trimming tool, and more particularly to a grass cutting tool adapted for use in trimming around sprinkler nozzle heads and the like.

It is conventional with sprinkler system of the kind where the nozzles are flush with the surface of the ground, or where the nozzles are of the self-rising type which are extended when the water is turned on, to provide a recessed space in the ground around each sprinkler nozzle. This, to a limited degree, assists in the problem of keeping the nozzle free from the grass of the lawn, because it is possible to trim the grass around the edge of the recesses so that it does not interfere with the action of the sprinklers. Normally this trimming operation is accomplished by hand clippers which is a very tedious, time-consuming job. Various grass trimming tools have been proposed, none of which has been particularly satisfactory because of inability to satisfactorily cut around the periphery of the recess, and because of inability to trim the grass which grows down inside of the recess. In any event, the hole around each sprinkler nozzle is retained, which is a considerable hazard for operation of a lawn mower or the like on the lawn, and can be dangerous for persons walking in the yard. Furthermore, the sprinkler head recess will collect water which will entirely stop the action of the sprinkler when it reaches the level thereof. Also, the greater amount of moisture in these openings fosters the growth of grasses and weeds foreign to the remainder of the lawn, and collect debris.

It is therefore an object of this invention to provide an improved, fast-acting trimming tool.

Another object of this invention is to provide a trimming tool whereby no recess is necessary around sprinkler-head nozzles.

A further object of this invention is to provide a trimming tool which prevents all grass from growing in the area surrounding the sprinkler head.

These and other objects will become apparent in the following detailed description, taken in connection with the accompanying drawing in which:

Fig. 1 is a sectional view of the trimming tool as used with a typical sprinkler head, Fig. 2 is a fragmentary sectional view illustrating the cutting action of this trimming tool, Fig. 3 is a sectional view of a cup member for use near an obstruction, and Figs. 4 and 5 are sectional views of modifications of this invention.

Referring to the drawing, in Fig. 1 there is illustrated a typical lawn sprinkler nozzle arrangement wherein a riser 1 connects with a main water line 2, and at the upper end thereof is provided with a nozzle 3. Normally with such a system, the top of nozzle 3 is substantially flush with the surface of the ground. Usually several such nozzles are provided so that when the water is turned on at the faucet it will be distributed by the nozzles to the entire area of the surrounding grass or other growth. Sometimes these nozzles are of a type which will automatically rise to a position above the surface of the ground in response to the water pressure to facilitate the distribution of the water. The grass trimming tool of this invention will work equally well with either type of sprinkler head.

One portion of this grass trimming tool includes a cup-shaped member 4 which has a substantially axially extending side wall 5 which joins a curved shoulder portion 6. End wall 7 extends from the shoulder and is provided with a centrally disposed aperture 8 therethrough. Member 4 is adapted to be inserted into the ground around the sprinkler with outer edge 9 of wall 5 extending downwardly into the ground, and end wall 7 engaging the surface of the ground on the under surface thereof. When in this position, sprinkler head 3 will be received within aperture 8 and member 4 is then disposed in surrounding relationship with the sprinkler head. It should be observed that there is no recess provided around the sprinkler head so that the ground is received within the interior of hollow member 4 as well as being disposed around this member. The top of end wall 7 continues substantially in line with the surface of the ground so that the sprinkler nozzles provide no obstruction to walking or use of a lawn mower or the like. Member 4 may be very easily installed in its position around the nozzle by manually forcing it down over the sprinkler head when the ground is soft. Aperture 8 should of course be dimensioned so that the fluid distributing portion 10 of the nozzle will be unobstructed by end wall 7. In the embodiment illustrated in Fig. 1, the periphery of aperture 8 engages the edge of the laterally extending flange 11 of the nozzle around the fluid distributing portion 10 thereof, which facilitates positioning of member 4 in the ground in the proper relationship with the nozzle. However, although facilitating installation, it is not necessary for the edge of the aperture to so overlap the sprinkler nozzle, and it may be substantially the dimension of the exterior of the flange if desired. Where the sprinkler head is of the self-rising type it is normally portion 10 thereof which moves upwardly in response to water pressure. Thus engagement of the outer flange of the sprinkler head by member 4 will not in any case interfere with the sprinkler action. Of course, member 4, which is at all times retained within the ground, should be of a corrosion resistant material such as aluminum, cadmium plated steel or stainless steel.

The second portion of the grass trimming tool also includes a hollow, substantially cup-shaped member 12 which, if desired, may be identical to member 4, with the exception of the provision of the central aperture. Thus, member 12 includes an axially extending wall 13 terminating in an outer circumferential edge 14. End wall 15 of member 12 is provided with a handle member 16 projecting therefrom. This handle may be secured to member 12 in any suitable manner and in the preferred embodiment it extends through an opening in this member, and is welded thereto on both sides of end wall 15. The upper end of handle 16 includes a suitable hand grip portion 17.

It is obvious thus far that no grass or the like can grow in the immediate area around the sprinkler where the member 4 is inserted in the ground. Any grass or other growth which will interfere with the operation of the sprinkler must send out runners across end wall 7 of this member. By the provisions of this trimming tool, such runners are easily severed so that there is no problem of trimming around the sprinkler nozzle. For cutting such growth, member 12 is superimposed on member 4 so that lower edge 14 of member 12 is adjacent upper curved shoulder 6 of member 4. By simultaneously exerting an axial thrust and rotating member 12 about its axis, all grass runners extending across member 4 will be instantly cut. Edge 14 is preferably squared off so that inner corner 18 thereof presents a highly effective cutting edge, but it will operate satisfactorily even if this is not done. With member 12 conveniently held by hand grip 17 it is necessary only to exert a twist of the wrist at the location of each sprinkler head in order to cut all growth which tends to grow to a position interfering with the nozzle. Member 4 is dimensioned so that when the grass is trimmed at shoulder 6 there will be no interference with the water from the sprinkler by the remaining grass. When member 4 is around 4½ inches in diameter it has been found that the sprinkler pattern will not strike surrounding grass of even greater than normal height.

The fact that member 4 has a curved upper shoulder 6 facilitates positioning of member 12 thereon for a cutting operation, and provides a self-aligning feature. When edge 14 engages this curved surface, any axial force on member 12 tends to center this member with respect to member 4, so that line contact is maintained between edge 14 and shoulder 6 around the entire circumference thereof. It is preferred to construct cup-shaped member 12 of a relatively flexible material so that if it should remain misaligned to any extent, it will assume a generally oval contour as a result of the end thrust thereon. This will provide line contact around shoulder 6 so that efficient cutting can take place. 0.031 inch thick cadmium plated steel has been found satisfactory for this purpose.

In some instances, sprinkler head nozzles are located rather close to a curb or other obstruction, so that it will be impossible to insert the member 4 as illustrated in Fig. 1 around such a nozzle because of interference from the curb. For such instances the embodiment of Fig. 3 is provided, wherein aperture 8 of member 4 is disposed to one side of the center of this member. This enables member 4 to be inserted over the sprinkler with nozzle 3 received within the aperture, while no interference is encountered from curb 19. In such installations there will be, of course, no grass or other growth on the curb side where the space between the side wall and the aperture is a minimum. This means that the members 4 and 12 will be as effective as in the previously described embodiment in cutting grass or the like which might interfere with the sprinkler nozzle.

A modification of the invention is illustrated in Fig. 4 wherein edge 14b of cup-shaped member 12b is constructed slightly larger in diameter than the top of member 4b so that side wall 13b of member 12b will actually extend over side wall 5b of member 4b. For this modification, the provision of a rounded shoulder 6b is not as critical and the cutting action will take place when edge 14b of member 12b is forced down over wall 5b of member 4b. Member 12b should, of course, be dimensioned in this embodiment so that side wall 13b has an inside diameter approximating the outside diameter of side wall 5b. Such a device has an advantage for packaging and shipping because members 4b and 12b can be compactly nested.

For a further modification of this invention, flange 11a of the sprinkler head itself may be constructed as shown in Fig. 5, eliminating the need for a separate cup member 4. Here the flange is larger than normal and is provided with a rounded outer shoulder 6a. Cutting action takes place at this shoulder exactly as with the arrangement of Fig. 1, but installation is simplified by making the bottom member and the sprinkler head integral.

It is thus apparent that I have provided an improved grass trimming device whereby no grass or the like is allowed to grow in the immediate vicinity of a sprinkler nozzle, and whereby any growth sent out toward the nozzle can be trimmed off in only a moment's time. Furthermore, by virtue of the fact that there is no hole around the sprinkler nozzle, there will be no interference with the operation of a lawn mower or other yard tool, and no hazzard to people walking on the lawn, as well as no localized collection of water or other material.

The foregoing detailed description is to be clearly understood as given by way of illustration and example only, the spirit and scope of this invention being limited only by the appended claims.

I claim:

1. A trimming tool comprising a hollow cup-shaped member, said member having a curved circumferential shoulder connecting with an end wall and with a side wall, whereby said member is adapted for installation in the ground adjacent a sprinkler nozzle with said side wall surrounding said nozzle and said end wall substantially flush with the surface of the ground, said member being further provided with an aperture in said end wall adapted to receive said sprinkler nozzle when said member is so installed; and a second hollow member having a circumferentially extending lower edge adapted to be superimposed on said shoulder of said first member, said lower edge being dimensioned to circumferentially engage said shoulder when said second member is so positioned, whereby a simultaneously applied axial thrust and axial rotation of said second member cuts grass and the like extending over said shoulder of said first member.

2. A trimming tool comprising a first hollow member having a curved annular shoulder portion, and an end wall provided with an aperture therethrough, whereby said member is adapted to be permanently installed in surrounding relationship with a sprinkler nozzle the upper surface of which is substantially flush with the surface of the ground; and a second member movable to a position where the same is superimposed on said first member, said second member having an annular outer edge dimensioned to engage said shoulder when said second member is superimposed on said first member for severing grass and the like extending over said shoulder.

3. A device as recited in claim 2, in which said second member is constructed of a relatively flexible material, whereby line contact is obtained between said edge and said shoulder for substantially all positions of such engagement.

4. A trimming tool for use with a submerged sprinkler nozzle comprising a first cup-shaped member having substantially axially extending side walls terminating in an outer edge and connecting with a rounded annular shoulder portion, said shoulder portion communicating with an end wall having an aperture therethrough, said aperture being substantially the diameter of said sprinkler nozzle, whereby said member is adapted to assume a position surrounding said nozzle with said nozzle received in said aperture, and said end wall in substantial alignment therewith; and a second substantially cup-shaped member, having an axially extending side wall terminating in an annular outer edge, and an end wall connected therewith, said end wall having a handle means projecting therefrom, and said side wall being constructed of a relatively flexible material, said second member being movable to a position where the same is superimposed on said first member, said outer edge of said second member being dimensioned to circumferentially engage said shoulder of said first member when said second member is so superimposed for cutting of grass and the like extending over said shoulder upon the exertion of an axial force urging said second member toward said first member and a simultaneous rotation of said second member relative to said first member.

5. A trimming tool for a buried sprinkler having a fluid distributing portion and a laterally extending flange projecting therefrom, said tool comprising a first cup member having a side wall interconnecting through a rounded shoulder with an end wall, said end wall being provided with an aperture therethrough the periphery of which is adapted to abuttingly engage said flange with said fluid distributing portion projecting therethrough and said side wall projecting downwardly around said sprinkler; and a second cup member having a side wall terminating in an outer edge, the inner corner of which is adapted to engage said rounded shoulder, an end wall extending from said side wall, and handle means projecting from said end wall whereby said second member is adapted to receive a simultaneous axial thrust and axial rotation for thereby cutting grass and the like disposed between said outer edge and said rounded shoulder.

6. A trimming tool comprising a first member adapted for insertion in the ground, said member having a fluid distributing portion and a flange portion extending laterally therefrom, said flange portion including a circumferential cutting surface remote from said fluid distributing portion; and a second member movable to a position where the same is superimposed on said first member, said second member including annular lower edge surface portions dimensioned to engage said cutting surface when in such position, whereby rotation of said second member relative to said first member cuts grass and the like disposed therebetween.

References Cited in the file of this patent
UNITED STATES PATENTS

| | | |
|---|---|---|
| 106,437 | White | Aug. 16, 1870 |
| 1,480,151 | Cosman | Jan. 8, 1924 |
| 1,791,957 | Cummings | Feb. 10, 1931 |
| 1,857,383 | Johnson | May 10, 1932 |
| 1,866,073 | Aberle | July 5, 1932 |
| 2,080,341 | Shumacher | May 11, 1937 |
| 2,615,246 | Littig | Oct. 28, 1952 |